(No Model.)
G. M. GERHAUSER.
HOSE COUPLING.
No. 280,169. Patented June 26, 1883.
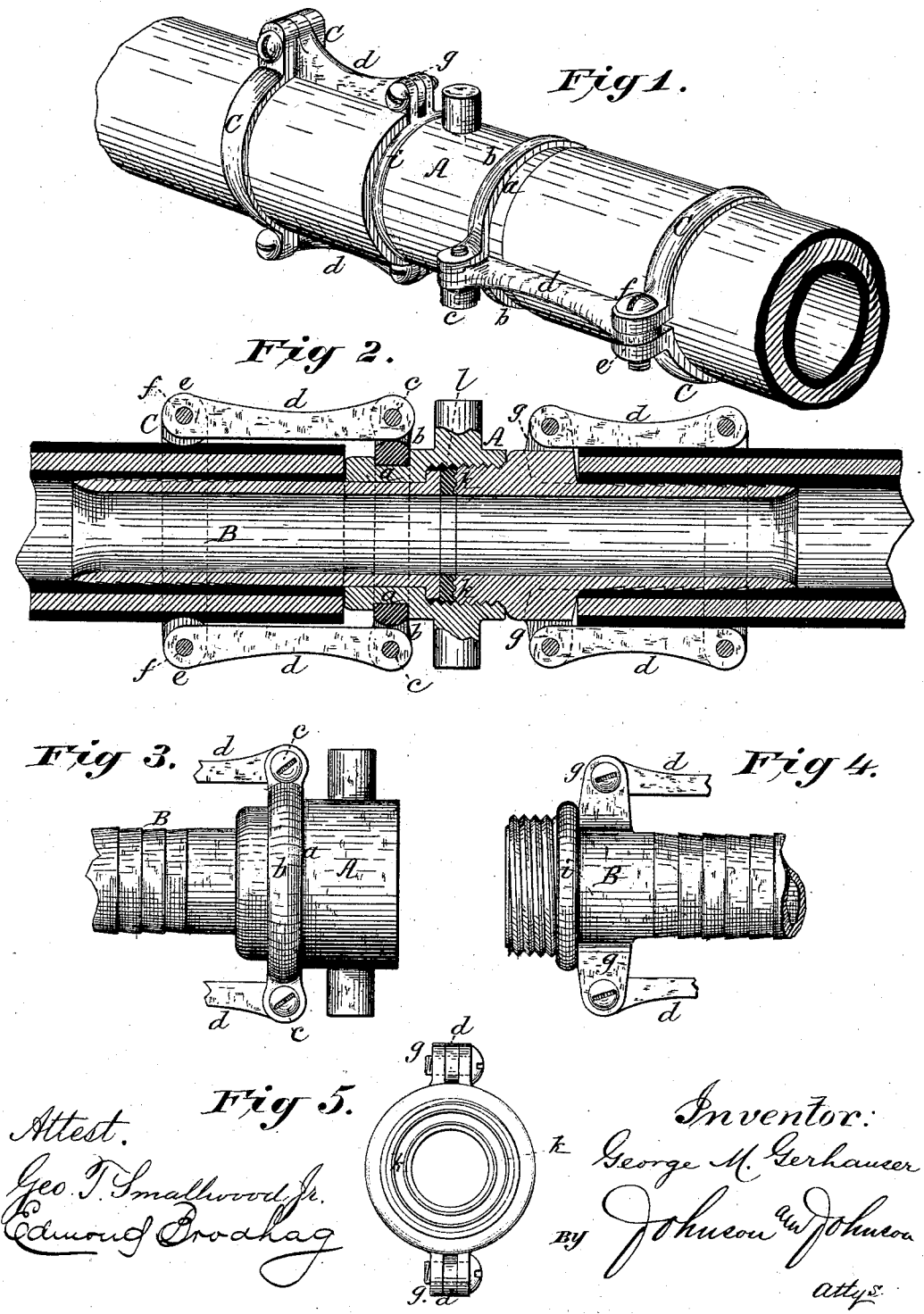

UNITED STATES PATENT OFFICE.

GEORGE M. GERHAUSER, OF BALTIMORE, MARYLAND.

HOSE-COUPLING.

SPECIFICATION forming part of Letters Patent No. 280,169, dated June 26, 1883.

Application filed February 17, 1883. (No model.)

*To all whom it may concern:*

Be it known that I, GEORGE MARTIN GERHAUSER, a citizen of the United States, residing at Baltimore city, in the State of Maryland, have invented new and useful Improvements in Hose-Couplings, of which the following is a specification.

My improvements relate to means for securing the couplings of flexible hose, for the purpose of making a continuous tube to conduct water, steam, or air under pressure. Such couplings are well known to those skilled in the art.

My object is to prevent the flexible hose from being forced off from the coupling, either by reason of great pressure in conducting water, or by the action of heat and pressure in conducting steam. As now commonly used, the extension-tubes of the male and female couplings are confined and held within the flexible hose by sectional ring-clamps around the hose, binding the latter upon the threaded tubes; but these ring-clamps, having no connection with the couplings proper, have often failed to perform their office.

I am aware that the coupling proper and the clamp have been proposed to be made in a single casting with rigid arms connecting them; but while this aims to accomplish my object it is not at all a similar construction, and does not possess the advantages of mine, as I shall hereinafter set forth.

The object of my particular improvements is to connect the coupling proper with the clamp by simple mechanical means, which are hereinafter set forth and claimed, with reference to the accompanying drawings, in which—

Figure 1 is a view in perspective, showing two joined sections of flexible hose; Fig. 2, a longitudinal section; Fig. 3, a detail of the female coupling proper; Fig. 4, a detail of the male coupling proper; and Fig. 5, an end view, showing the ring grooves or cuts adapted to bite into the gasket-ring in the female coupling, and thus make a perfectly air-tight joint.

Those skilled in the art will readily see the adaptation of my improvements to the common method of coupling hose now in use.

In the drawings, A is the union of the female coupling, which has the extension-tube B, for insertion into the hose, as usual; but it differs from the ordinary coupling, in that it is cast with a ring-groove, $a$, or shoulder. This ring-groove is for the purpose of loosely holding a sectional ring of two parts, $b\ b$, joined by bolts $c\ c$, to form pivots for arms $d\ d$, which connect with the sectional ring-clamps C C, by having their eyed ends $e\ e$ interposed between the eyed ends of the clamps, and fastened by the bolts $f\ f$, as shown. The sectional ring $b\ b$ might be held by a shoulder or equivalent device, but always in such manner as to permit the female band A of the union to make the connection by being turned with a spanner in the well-known manner. The connection of the hose-clamps C with the male coupling B is analogous, and only differs out of the necessity of construction. In this male coupling, lugs $g\ g$ project from opposite points cast therewith, to receive the arms $d\ d$, which are connected to the clamps C, as before described. Also, in this case, the hose itself must be cut out to receive the lugs $g$, and fit up to the shoulder-collar $i$ of the coupling.

I do not depart in any manner from the ordinary construction of hose-coupling now in use, and as the drawings show, except in so far as stated—that is to say, my coupling can be used with the ordinary sectional ring-clamps now in use.

As shown in Figs. 2 and 5, the end face of the male coupling is formed with ring-grooves or guttered, as at $k\ k$, to bite into the gasket $l$ in the female coupling, and thus form an air-tight joint for conducting compressed air. It will be understood that the female coupling can be screwed directly to a pipe or hose bib.

I claim—

1. The combination of the male coupling of a hose-connection, provided with lugs $g$, arms $d$, pivoted to said lugs, and clamp C, with the female part provided with a circumferential groove, a sectional ring, $b$, fitting in said groove, and the arms $d$, pivoted to said sectional ring and to the clamp C for the hose, substantially as described, for the purpose specified.

2. The combination of the clamps C C, the coupling-union A, having the ring-groove $a$, the sectional ring $b\ b$, and arms $d\ d$, hinged to said ring, as set forth, and connecting with said clamp, substantially in the manner described.

3. The male coupling having lugs $g\ g$, in combination with the arms $d\ d$, pivoted therein, and the clamps C C, substantially as and for the purpose set forth.

4. In a hose-coupling, the combination, with the clamps C C, of the female coupling A and the male coupling B, each provided with pivoted arms $d\ d$, adapted for connection over the hose with said clamps, substantially as and for the purpose set forth.

In testimony whereof I have hereunto set my hand in the presence of two subscribing witnesses.

GEO. MARTIN GERHAUSER.

Witnesses:
A. E. H. JOHNSON,
J. W. HAMILTON JOHNSON.